July 24, 1956 — M. TOBIAS — 2,756,410

LIQUID LEVEL WARNING DEVICE

Filed March 25, 1952

INVENTOR:
MILTON TOBIAS
BY
Walter J. Stevenson
AGENT

United States Patent Office 2,756,410
Patented July 24, 1956

2,756,410

LIQUID LEVEL WARNING DEVICE

Milton Tobias, Los Angeles, Calif.

Application March 25, 1952, Serial No. 278,416

1 Claim. (Cl. 340—181)

This invention relates generally to fuel gauges for indicating the volume of liquid fuel contained within a tank, and particularly to such an indicator located at a point remote from the tank. Specifically, the invention is concerned with an electrically controlled device for warning of an approaching low level, that is, near depletion of the supply of liquid in the tank, so as to indicate that the supply should be replenished in order to avoid an empty tank condition.

Automobiles and other motor vehicles are currently provided with an electrically operated fuel gauge on the dashboard, such a gauge or indicator usually consisting of a meter connected in series in an electrical circuit which includes the vehicle storage battery and a float-actuated "sender," in the form of, for example, a rheostat or bimetallic element mounted on the fuel tank and having a switch and a float actuating means within the fuel tank. Rotation of the rotor of the rheostat in response to changes in the liquid level serves to vary the resistance or power on time and the flow of current or potential of the circuit and the meter functions to indicate such rate of current flow or potential, the dial of said meter being graduated in terms denoting liquid level values from "empty" to "full."

It is a recognized fact that such fuel gauges indicate only approximately the level of the fuel in the tank and it is common practice to so design the fuel gauge and other elements of the fuel gauge system that when the gauge indicator finger shows an "empty" reading, there exists a small reserve supply of fuel in the tank, calculated to avoid the inconvenience and exasperation of running out of fuel. Such remote fuel gauge systems are, however, notoriously inaccurate and unreliable due to their insensitivity, so that at best the gauge reading is only an approximation of the existing fuel level. Another reason for running out of fuel is that the operator frequently fails to observe the gauge reading until after the indicator finger has already reached the zero graduation so that the actual amount of fuel remaining in the tank is undeterminable and the driver may find, to his disadvantage, that he has overestimated the content of the tank.

It is therefore an object of this invention to provide an automatically operated signaling means for warning a vehicle operator of a low fuel condition, said signaling or warning means being in the nature of an accessory adapted for convenient attachment to the dashboard of a motor vehicle, without altering in any way the conventional existing fuel gauge system of the vehicle.

Another object of the invention is to provide a warning device for detecting the near empty condition of the fuel tank of a vehicle, said device including a very sensitive relay so connected to the conventional fuel gauge located on the dashboard as to be energized when the fuel level in the tank reaches a preset point, so as to energize a warning light, buzzer or other signal, either in combination or separately, as desired.

Another object is to provide a warning system, of the character referred to, which may be designed for use in warning of either a low level or high level condition in a liquid storage receptacle, regardless of the volumetric size of the latter or the character of the liquid content stored therein. In either case, the warning system is embodied in a separate unit adapted for attachment to the existing fuel gauge system without seriously affecting the accuracy of the latter.

Another object is to provide a warning system of the type indicated which operates on the principle that the "sender" on the fuel tank varies either the potential or current, or both, through or to the fuel gauge indicator. Due to this fact, a sensitive relay may be connected across the sender to ground, or in series with the sender wire or wires, and set either by a variable resistor or by magnetic or spring tension characteristic of the relay to operate (pull in or drop out) at a point where the sender transmits a given signal, usually an "empty" or "low level" signal, although the setting alternatively may be made for a "full" or "high liquid level" warning. Either the normally open or normally closed contacts of the relay may be used as required for specified installations.

It has been determined in practice that when the fuel level of the vehicle tank approaches its near empty, or full, setting fluctuations in the liquid level frequently occur as the result of road conditions or vibrations set up by the engine. Such fluctuations may cause sudden surges of current in the fuel gauge circuit to actuate the sensitive relay and thus energize the warning light and buzzer to erroneously indicate a dangerously low fuel supply in the tank when in reality there exists an adequate fuel supply. Such erratic and deceptive warnings may result in exasperation on the part of the vehicle operator and thus cannot be tolerated. It is therefore another important object of my invention to provide means for preventing the occurrence of such unwarranted and irritating warning signals. In accordance with the invention, this means consists of a thermal time delay relay connected in the warning circuit, said thermal unit being operative to pass current to the warning buzzer and light only when it is activated for a period of, say, from 15 to 120 seconds. By this provision, sudden surges of current in the fuel gauge circuit, due to shifting of the fuel supply in the tank, are effectively prevented from causing actuation of the warning signal devcies and, as a result, activation of the warning signals indicates a true low fuel level condition.

A further object is to provide a warning device which may be embodied in a simple, light-weight unit in which the sensitive relay, the thermal time delay relay, the light, the buzzer and switch are installed in or on a box-like casing adapted to be detachably mounted on the dashboard, said unit having only two wires projecting from the casing for attachment respectively to the fuel gauge, and the vehicle D. C. supply. Such a unit is particularly adapted for sale at a relatively low retail price by automotive accessory stores and is capable of being installed by car owners possessing little, if any, mechanical skill by following simple instructions provided with the unit.

Further objects will appear from the following description and from the drawing, which is intended for the purpose of illustration only, and in which.

Figure 3:
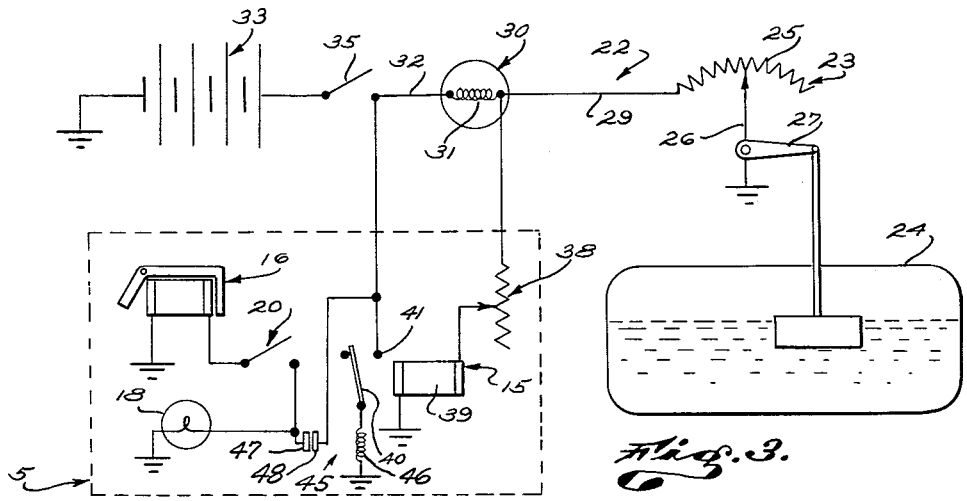
Fig. 3 is an electrical diagram, showing the present warning device connected in parallel with the main electrical fuel gauge system of the vehicle.

Referring to the drawing in detail my low fuel level warning device includes a box-like casing 5 having a removable cover 6. The casing 5 carries a U-shaped bracket 7 having a clamping screw 8. The casing is adapted to be mounted at the lower flanged edge 9 of the dashboard 10 of a motor vehicle with the sides of the bracket straddling the flange of said edge, the screw 8 being tightened against the upper surface of the flange to detachably mount the casing in position to be readily observed by the operator of the vehicle.

Secured within the casing 5 is a sensitive relay 15, to be described in more detail hereinafter. Also mounted within the casing 5 is a buzzer 16 and a socket 17 carrying an electric warning lamp 18. The lamp 18, when lighted, is visible through an opening in the front wall of the casing 5 and preferable a red jewel-like lens 19 is disposed within the opening to accentuate the light emanating from the lamp and to thus provide a brilliant flash which immediately attracts the attention of the operator. A switch 20 is also mounted on the casing 5 with its actuating element projecting from the front thereof in position to be operated by the driver of the vehicle. The switch 20 may be of the push-pull, snap or any other conventional type suitable for the purpose. A thermal time delay relay 45 is also located within the casing 5, being employed for the purpose to be later explained.

Referring now to Fig. 3 of the drawing, my improved low fuel level warning device is adapted to be connected in parallel in the main fuel gauge circuit 22 of the vehicle as shown. The conventional fuel gauge circuit includes a tank unit or "sender" 23 mounted on the tank 24 and embodying a rheostat unit 25 whose rotor arm 26 is connected to and operated by a float arm 27, this arm raising and lowering in response to variations in the level of the liquid fuel 28 in the tank so as to rotate the rotor arm 26 and vary the resistance of the rheostat unit, said arm being grounded or on-off time of a bi-metallic sender in the chassis of the vehicle as shown. In other installations, the sender may be of the common on-off bi-metallic type.

A conductor 29 leads from the resistance coil of the rheostat 25 to one terminal of a fuel gauge 30, of conventional type, which is installed on the dashboard 10. The fuel gauge 30 is an electrical meter whose dial graduations indicate units of liquid measure or simply the level of the fuel in the tank, expressed as "empty," "¼," "½," "¾," or "full." The meter 30 has a small coil 31, one end of which is connected to the conductor 29 and the other end of which is joined to a conductor 32 extending from the positive side of the vehicle battery 33, the other side of the battery being grounded as shown in the diagram. As is usual in automobile electrical systems, an ignition switch 35 is interposed in the line 32 and serves to energize the fuel gauge circuit when the ignition system is likewise energized.

The present warning device includes a resistor element 38 which may be either of the fixed or variable types, said resistor being connected to a terminal of the electrical meter-type fuel gauge 30 and to the coil 39 of the sensitive relay unit 15, the coil being grounded as shown. The relay 15 includes a pole piece or armature 40 adapted to engage a contact 41 when energized by the coil 39 so as to close the circuit to the electric lamp 18 and to the buzzer 16 through the normally closed switch 20. As shown in Fig. 3, the relay coil 39, the lamp 18 and the buzzer 16 are grounded in the casing 5 which is electrically connected to the frame of the vehicle. The conventional meter 30 is designed to have a resistance to meet the usual conditions. When the float resistance is zero ohms at one end of its travel, the meter is subjected to full six volts. The meter therefore has sufficient resistance to prevent burnout. The resistance required in the battery lead is furnished by the internal resistance of the fuel gauge meter 30.

When the ignition switch 35 is closed, current flows from the battery 33, through the conductors 32 and 29, coil 31 of the gauge 30, the rheostat unit 23 to ground, the current flow being determined by the setting of the rheostat rotor 26, as controlled by the float means 27. That is to say, when the float rises in the tank, as fuel is introduced thereinto, the rotor 26 moves to reduce or increase the resistance and thus increase or decrease the potential in the line 32—29. This condition causes the meter coil 31 to move the indicator or pointer of the gauge 30 toward the "full" or "empty" graduation, the point at which the indicator comes to rest designating the level of the liquid fuel in the tank 24.

During operation of some vehicles, as the supply of fuel in the tank is used, the float descends to move the rotor 26, in a direction to gradually reduce the flow of current through the main fuel gauge circuit, that is, to increase the potential. Ordinarily, the voltage developed in the line 29, as when the gauge 30 indicate, a safe working quantity of fuel in the tank, is very low and insufficient to energize the coil 39 of the relay 15 so that the circuits to the lamp 18 and buzzer 16 remain de-energized. However, as the float descends to a position adjacent the bottom of the tank, as when the tank is nearly empty, the voltage in the line 29 eventually increases to a value which is sufficient to energize the relay coil 39. In this respect, it is pointed out that the particular relay used in my device is operative in response to low voltage at low current. It is thus seen that the relay is extremely sensitive and this is of great importance in any warning device since without such sensitivity the warning might occur too late to apprise the vehicle driver of impending low fuel supply and possible stalling of the vehicle due to emptying of the tank.

Upon actuation of the relay 15, the lamp 18 is lighted to warn the vehicle operator of approaching depletion of the fuel supply. As an additional precaution, the circuit to the buzzer 16 is simultaneously closed to produce an audible warning signal. Thus, by my system two separate warnings are produced to insure that a low fuel supply will be positively called to the operator's attention. After the buzzer has operated and has been heard by the vehicle driver, it may be readily silenced by simply actuating the switch 20 to open the circuit in which the buzzer is connected. The light 18, however, remains lighted until the supply of fuel in the tank 24 is replenished, at which time the float rises to actuate the rheostat 23 so as to reduce the voltage in the circuit 29 to a value where the relay 15 is de-energized to open the circuit to the warning lamp. Thus, it is seen that my warning device is wholly automatic, positive and accurate in operation.

As is well known, the liquid fuel carried by a motor vehicle is constantly subjected to forces which cause it to move or flow within the tank, the level of the fuel also fluctuating as a result of vibrations set up in the vehicle by its operating parts. Such fluctuations in the liquid level have the effect to cause surges of current in the gauge circuit due to sudden actuation of the sender. By the circuit as thus far described, such sudden increases of current flow and potential would cause the sensitive relay 15 to be energized, to activate the warning means 16 and 18, even when the level of the liquid fuel is within the safe driving range, that is, above the dangerously low level. Consequently, as the liquid fuel splashes around in the tank, due to travel of the vehicle over rough roads, around curves, up and down hills, etc., the warning device may erroneously indicate a low fuel level condition. Such unwarranted actuation of the warning means, particularly the audible signal, may become irritating to the vehicle operator and cannot be tolerated. For this reason, the present invention contemplates the provision of means for alleviating this condition.

Such means consists of an auxiliary thermal time delay relay 45 interposed between the sensitive relay 15 and the signal devices 16 and 18. As shown, the auxiliary relay 45 has a coil 46 connected between the armature 40 and ground, and adapted to actuate a movable contact 47 into engagement with a fixed contact 48. The contact 48 is connected to the source of D. C. current while the contact 47 is connected in the line to the warning devices 16 and 18. The coil 46 of the auxiliary relay 45 is of the type which becomes fully active only when current flows through it for a predetermined time, for example, approximately 60 seconds optimum, such thermal time delay relays being commonly used in various electrical installations and therefore not herein shown or described in detail.

By the use of the thermal time delay or retarding relay 45 in the warning circuit, as above described, energization of the warning means 16, 18 is delayed for a predetermined period of time following activation of the relay 15 so that the low level of the fuel in the tank must exist for at least said period of time prior to energization of the signals 16, 18. Thus, the vehicle operator is warned only of a true low fuel level condition existing continuously in the tank for a substantial period of time and the possibility of falsely indicating a low level where such a condition exists only momentarily, is avoided.

Figure 4:
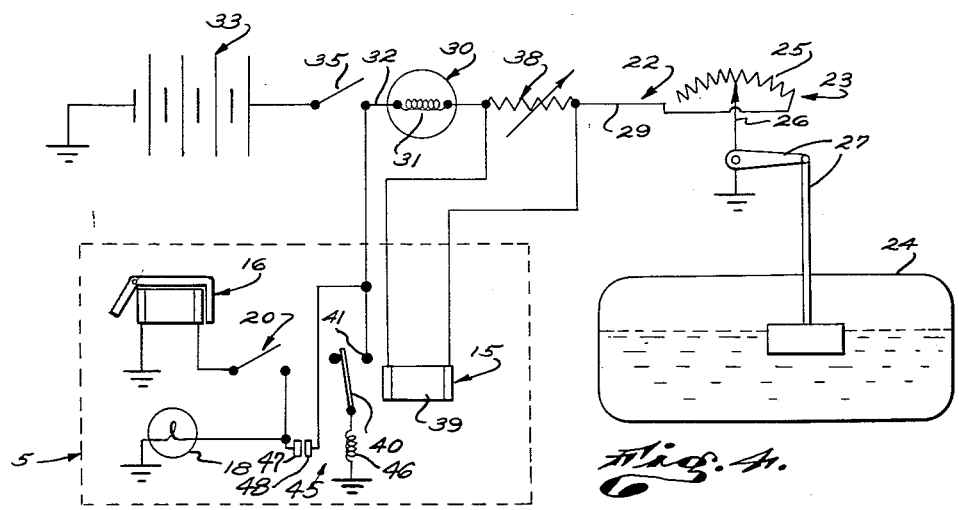
Fig. 4 is another electrical diagram, illustrating how the warning device may be connected in series with the fuel gauge circuit.
Figure 1:
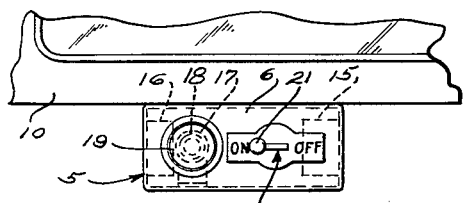
Fig. 1 is a front view of my improved low fuel level warning device, showing it mounted at the lower edge portion of the dashboard of a motor vehicle.
Figure 2:
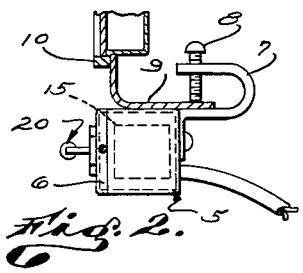
Fig. 2 is a side view of the same.

In some installations, the warning device circuit may be connected to the main circuit as shown in Fig. 4 in which case the variable resistor element 38 is connected in series in the main gauge circuit 22 and the coil of the relay is shunted around the resistor element. In all other respects, the circuit of Fig. 4 is similar to that illustrated in Fig. 3.

In either of the installations referred to above the resistor element 38 may be either of the variable type, or of the fixed type, depending upon the conditions involved. That is to say, motor vehicles produced by different manufacturers employ various types of fuel gauges and circuits in which the potential or current in the gauge system differs. Thus, by providing a variable resistor, the potential necessary to actuate the sensitive relay when the low fuel setting of the fuel gauge pointer is reached, may readily be obtained. When the variable resistor is incorporated in the warning device, the resistor may be preset or adjusted in accordance with the conditions to be expected in particular automobiles or in an entire line of cars made by certain manufacturers, or the resistor may be adjusted after installation of the warning device in a car to adapt the device to function properly when connected in the gauge circuit of this particular car. On the other hand, the devices may be equipped with fixed resistors of different ohm values for use in connections with the gauge circuits of particular makes of automobiles of current types. The resistor 38 may be set to effect energizing of the warning device only when the rheostat 23 has maximum resistance, that is, when the float is adjacent the bottom of the fuel tank 24.

A differential relay may be employed to overcome changes in car voltages which may occur when the car generator is operating, as compared to voltages present when the car motor is inoperative. However, by setting the warning device by means of the variable resistor while the generator is operating, the use of such a differential relay is unnecessary.

It will be observed from the foregoing that my invention provides a very simple, yet highly efficient and practical warning device for use in warning the operator of a motor vehicle of approaching emptiness of the fuel tank so as to avoid inadvertent stalling of the vehicle due to this cause. As described, the warning device is a self-contained unit or accessory which may be easily clamped to a dashboard of a vehicle and conveniently connected for operation by simply joining two wires thereof to the ignition switch and electric fuel gauge of the vehicle. In this respect, the instant warning device differs from those heretofore proposed which must be embodied in either the fuel gauge on the dashboard or require a sender specially designed to energize the warning circuit. As a special feature of the present invention, a very sensitive relay is employed so that great accuracy in energizing the warning circuit, when a low fuel condition actually exists, is effected. Another feature of improvement resides in the double warning means, that is, the electric lamp and the electric buzzer, this dual warning means being highly effective in directing the vehicle operator's attention to the low fuel supply. As another adjunct, a switch is provided by which the operation of the buzzer may be discontinued after it has provided its audible signal. It is also important to note that the present improved warning device embodies a thermal time delay relay connected in series between the sensitive relay and the warning light and buzzer. By this provision, momentary low fuel level fluctuations, caused by shifting of the liquid fuel due to road conditions and vibrations, are prevented from activating the warning signals, the warning device thus functioning only after such a low fuel level exists for a predetermined time to accurately indicate a true low level condition.

In accordance with the patent statutes, I have disclosed herein what I consider to represent the best embodiments of the invention. It is to be understood, however, that various other modifications might be made in the construction and arrangement of the elements of the warning device within the spirit of the invention. Consequently, I do not wish to be limited in this respect, but desire to be accorded the full scope of the appended claim.

I claim as my invention:

A liquid level warning device for use in connection with an electric fuel gauge circuit of a motor vehicle having a meter-type fuel gauge connected in series with and interposed between a battery and a sender of the rheostat type mounted on the fuel tank of the vehicle and actuated by float means within the tank, said battery and sender being grounded, comprising: a resistor element connectible in series between the gauge and the sender; a sensitive thermal time delay relay having a low-voltage coil shunted across said resistor element, said relay including a contact element and an armature actuable by said coil to engage said contact element, said armature being connectible in circuit with said battery and adapted, when actuated in response to current flow through said coil of predetermined value, to establish current flow from the battery to said contact element; and an electric signal means electrically connected between said contact element and ground, said relay being actuable in response to a potential of predetermined close limits developed in the gauge circuit as a result of a particular setting established by the float-actuated sender over a predetermined period of time.

References Cited in the file of this patent

UNITED STATES PATENTS

| | | |
|---|---|---|
| 594,323 | Carpenter | Nov. 23, 1897 |
| 880,273 | Bristol | Feb. 25, 1908 |
| 2,605,339 | Connolly | July 29, 1952 |

FOREIGN PATENTS

| | | |
|---|---|---|
| 15,514 | Great Britain | Apr. 13, 1904 |